United States Patent [19]

Sanders

[11] Patent Number: 4,839,062
[45] Date of Patent: Jun. 13, 1989

[54] METHOD OF HARVESTING AND HARVESTING DEVICE FOR BRINE SHRIMP EGGS

[75] Inventor: Bruce C. Sanders, Ogden, Utah

[73] Assignee: Sanders Brine Shrimp Company, Ogden, Utah

[21] Appl. No.: 139,580

[22] Filed: Dec. 29, 1987

Related U.S. Application Data

[63] Continuation-in-part of Ser. No. 56,111, Jun. 1, 1987, abandoned.

[51] Int. Cl.⁴ .................... A01K 61/00; A01K 79/00; C02F 1/40; E02B 15/00
[52] U.S. Cl. .................................... 210/776; 210/923; 56/9; 43/6.5; 119/2
[58] Field of Search ................. 56/8, 9, DIG. 2; 43/4, 43/4.5, 6.5; 119/2, 3; 210/242.3, 923, 776

[56] References Cited

U.S. PATENT DOCUMENTS 3,661,263  5/1972  Peterson et al. ............... 210/923
4,117,726 10/1978  McGroddy ..................... 43/6.5
4,205,626  6/1980  Muchmore et al. ............. 43/6.5

FOREIGN PATENT DOCUMENTS

104702  4/1984  European Pat. Off. ............. 119/2

Primary Examiner—Nicholas P. Godici
Assistant Examiner—Carmine Cuda
Attorney, Agent, or Firm—Thorpe, North & Western

[57] ABSTRACT

A method and device for harvesting brine shrimp eggs, wherein the method comprises the steps of positioning a concentrating funnel slightly below the layer of brine shrimp eggs at the surface level of a body of salt water; moving the concentrating funnel forward with respect to the eggs to collect a portion of the layer and pumping the slurry mixture of eggs and salt water to a porous receiving container which passes the salt water and retains the collected brine shrimp eggs. A device for implementing this method includes a platform and attached channeling structure with a receiving end and a smaller, rearward feeding end. This channeling structure includes a height adjustment mechanism for selectively raising and lowering a forward leading edge of the channeling device to a depth just below the egg layer. Plumbing hardware is provided to transport the egg and salt water slurry to a container for receiving the eggs.

21 Claims, 3 Drawing Sheets

METHOD OF HARVESTING AND HARVESTING DEVICE FOR BRINE SHRIMP EGGS

This is a continuation-in-part of parent application 07/056,11 filed on June 1, 1987 under the same title, now abandoned.

BACKGROUND OF THE INVENTION

1. Field of Invention

The present invention relates to a device and method for harvesting or collecting brine shrimp eggs from a water body. More specifically, the present invention relates to a device for extracting brine shrimp eggs at the surface of the water body.

2. Prior Art

Brine shrimp have been harvested for many years and are used as fish food on a commercial basis. See, for example, U.S. Pat. No. 3,768,193 by London which discloses a raft and a skimming net. The net is supported by pontoon floats and is utilized to capture the small brine shrimp from their water habitat. The wedge shaped collecting structure shown in London is also disclosed in U.S. Pat. No. 2,786,592 of Miller and 2,832,168 of Brown. This wedge construction assists in channeling the material to be harvested. U.S. Pat. No. 4,458,621 by DeClifford is a more recent disclosure showing another device and method for collecting marine life somewhat related to the previous patents cited.

During the past three decades, collection of brine shrimp eggs has been accomplished, with the eggs being washed, dried and vacuum packed for storage. These eggs can be reconstituted and hatched by incubation in salt water at 80 to 85 degrees F. The eggs may be nurtured to young brine shrimp, which are used as fish food for commercial hatcheries and similar businesses.

The methods and structure shown in the London patent are not effective for gathering brine shrimp eggs. For example, there are approximately seven million brine shrimp eggs in a single ounce. The use of nets and similar devices for collection of brine shrimp eggs would be totally meaningless. The eggs would pass through the nets with little success in collection.

Accordingly, prior art collection of brine shrimp eggs has been accomplished by collecting the eggs left along beach surface area. Such collection has been by shovel or other type of scraper. The thickness of eggs deposited on the beach depends upon the thickness of eggs floating at the water surface. Typically, the floating eggs occupy the top one quarter inch of water and may accumulate to depths on the beach of one half inch or more.

The unique character of brine shrimp eggs on a salt water surface has discouraged attempts to skim them in a manner similar to skimming oil slicks or other surface-floating material. Because such eggs are so small (7 million per ounce) they are extremely difficult to deal with as a solid material. A major portion will pass through nets and other forms of screening devices. On the other hand, they tend to agglomerate when concentrated and in close contact so that they lose their fluid character. For this reason, a standard skimming device used for extracting oil slicks is useless for gathering brine shrimp eggs.

It has been discovered that the challenge in harvesting brine shrimp eggs is to develop an economical way of concentrating them in bags for commercial utilization. Gathering them from the beach by scoops or shovels is difficult because they have lost their flowable character. Netting or screening them from the water surface is ineffectual because of their very small size. In actual attempts to utilize an oil skimming device to concentrate, it was found that the eggs cling together and solidify when concentrated, thereby becoming very difficult to pump. The typical floating surface leveling door used with oil skimmers does not function in the brine shrimp egg environment. In addition to the inability of the oil skimming device to handle jamming of eggs at the pump inlet, it did not provide the control necessary to adjust the amount of water taken with the eggs. With too much heavy salt water, it is impractical to filter out the eggs in the collection sacks. Too little water results in agglomeration of eggs with resultant failure of the pumping system.

OBJECTS AND SUMMARY OF THE INVENTION

It is an object of the present invention to provide a device and method for concentrating and extracting brine shrimp eggs from a body of salt water, as opposed to removal from the beach or shore area.

It is a further object of the present invention to provide a device and method for concentration and extraction or harvesting of brine shrimp eggs from the surface of a body of water in an economical and commercial manner.

It is a still further object of the present invention to provide a brine shrimp egg harvesting device which may be coupled to a self-priming pump for direct transport of eggs from the water surface to a storage container.

These and other objects are realized in a method for harvesting brine shrimp eggs which comprises the following steps. First, a layer of brine shrimp eggs is located on a body of salt water. A concentrating funnel is then. positioned such that a flat leading edge and lower trailing inlet port is slightly below the layer of brine shrimp eggs and the water surface. The concentrating funnel is then moved forward with respect to the eggs to collect a portion of the egg layer within the funnel as a slurry mixture of salt water and eggs. Finally, the slurry is pumped to a porous receiving container which passes the salt water and retains the entrained eggs.

This method may be practiced with a device for gathering brine shrimp eggs comprising a platform having a forward section, a support surface and lateral edges and a rearward section. A flotation support is coupled to the platform for maintaining sufficiency buoyancy to keep the platform floating at the surface of the water. A channeling structure includes a forward receiving end and a smaller rearward feeding end coupled to a forward section of the platform. The forward end includes a flat, leading edge adapted for positioning immediately below the egg layer. Means are provided for maintaining the channeling structure approximately at the surface of the water with the leading edge submersed just below the egg layer and water surface to direct brine shrimp eggs toward the narrow feeding end of the channel. A skimming device is coupled to the platform where the feeding end of the channel is attached and includes a height adjustment mechanism to raise and lower the channeling structure to an appropriate depth for extraction of the layer of eggs at the water surface.

Other objects and features of the present invention will be apparent to those skilled in the art, taken in combination with the following detailed description and accompanying drawings.

DETAILED DESCRIPTION OF THE INVENTION

It has been discovered that it is possible to extract brine shrimp eggs from the surface of a salt water body, despite the prior art perception that such harvesting techniques were impractical. To be economically effective, the extraction requires that a proper balance of salt water and entrained eggs be fed as a slurry to a collection container which is capable of passing the salt water through its porous wall structure, while retaining the collected eggs.

The technique is characterized by the following procedural steps. Once a suitable collection of brine shrimp eggs is located on a salt water body, the extraction equipment is moved to the collection area. Typically, this equipment will operate at the surface of the water, since brine shrimp eggs float in salt water, forming a concentrated layer from $\frac{1}{8}$ to $\frac{1}{4}$ inch thick.

The first step is to position a concentrating funnel within the layer of eggs to be collected. This funnel must have a flat, leading edge which can be positioned immediately below the layer of eggs. As used in this disclosure, a funnel may be anything that is capable of receiving a slurry mixture of salt water and eggs in a controlled manner. For example, a conical funnel having a flat, upper lip may be used by positioning the upper lip immediately below the egg layer. The following description details the use of a rectangular, pan-like funnel which uses a flat, leading edge to divide and separate the layer of eggs from the rest of the salt water body.

The controlled separation of egg layer from the water is critical. If insufficient water is taken, the entrained eggs tend to agglomerate and stick together. This action impedes the ability of a pumping device to transport the eggs to collection bags. Too much water, on the other hand, results in excessive water which makes separation by filtration uneconomical. Maintenance of this proper mixture is complicated by the constantly changing thickness of the egg layer. Unlike an oil slick which occupies a separate layer on top of the water and is therefore of constant thickness, the egg layer is actually entrained in an upper level of the water itself. There is no separation between the eggs and the water, thereby allowing the eggs to collect to different thicknesses.

Accordingly, the positioning step involves constant adjustment of the leading edge of the funnel to ensure its location just below the egg level. This is accomplished by using a height adjustment device to selectively move the funnel up or down, depending upon the change in layer thickness. The proper ratio of eggs to salt water is within the range of approximately 300 to 1500 grams of eggs to one liter of water, with the preferred range between 600 and 1100 grams per liter. This can be intuitively maintained by an experienced operator who becomes accustomed to the consistency of the slurry mixture.

The funnel is then moved through the water, making height adjustments as necessary to maintain proper slurry consistency. The slurry mixture is received within the funnel and falls by gravitation to an inlet port which is connected to a plumbing system for transporting the slurry to a bank of containers. It is important that the inlet port and other plumbing components be of sufficient opening size to allow free flow of the eggs. Otherwise, the eggs stick together and clog the transport lines. A pump delivers the slurry to porous containers which allow water to pass, while retaining the entrained eggs. By using fabric bags as containers, the slurry mixture fills the bag to capacity or greater, with the water passing through the fabric. Following draining of the water component, the bag has a full constituent of eggs which are packaged and ready for commercial transport.

The steps of this method are generally represented in the following examples of devices useful for practicing the present invention. It will be understood that these examples are by way of illustration and are not to be considered limiting, except by the claims set forth hereafter.

Figure 1:
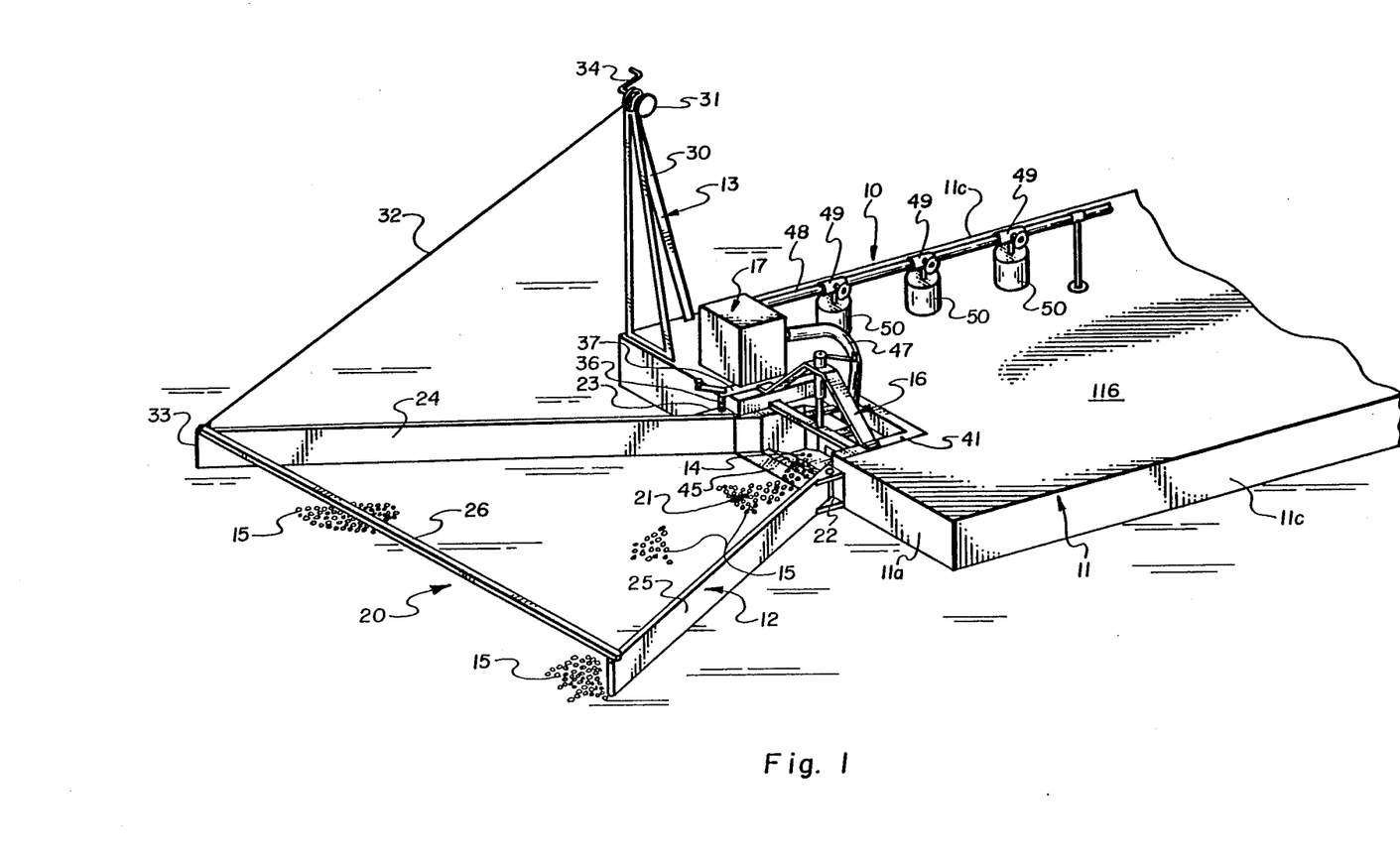
FIG. 1 shows a perspective view of the subject invention in operation at a water surface.

FIG. 1 illustrates the present invention in its flotation construction 10 which includes a platform 11, a wedge-shaped channeling structure 12, means for maintaining the channeling structure at an elevation with respect to the water surface 13, concentrating means 14 for extracting brine shrimp eggs 15, height adjustment means 16 for enabling proper adjustment of the concentrating means 14 to a depth of less than one inch to thereby divide off the entrained eggs 15 in the water, and extraction means 17 for transporting the captured eggs to a storage location. Each of these elements will be discussed in greater detail hereafter.

This first embodiment 10 is designed for use on a body of water such as a salt sea which typically has a calm surface with little wave or swelling action. An example of such a body of water is the Great Salt Lake in Utah. The subject invention 10 is designed to float at the surface of this body of water and to harvest the brine shrimp eggs 15 which float to the water surface and remain there until swept to the shore by wind or wave action. Although the drawing shows isolated pockets of brine shrimp eggs 15, typical occurrence is a widespread layer across the water surface The isolated patches are merely for simplicity and drawing and identifying the eggs with respect to the water.

The water surface harvester 10 is designed with the platform 11 as a primary support surface for the crew and other equipment used in the operation. This platform includes a forward section 11a, a support surface 11b, lateral edges 11c and a rearward section (not shown). The construction of such platform may be of virtually any material suitable for flotation at the surface of the body of water Such materials include wood, plastic, aluminum or fabrics. Virtually any raft configuration can be adapted, for use with the present invention as the platform structure.

Obviously, the platform must be adapted with a flotation or buoyancy device. The drawing of FIG. 1 illustrates a platform which has an encased Styrofoam body which provides the required buoyancy to the platform.

The platform can just as easily have been adapted with pontoon structure at the lateral edges 11c, or with other flotation means.

Figures 2, 3:
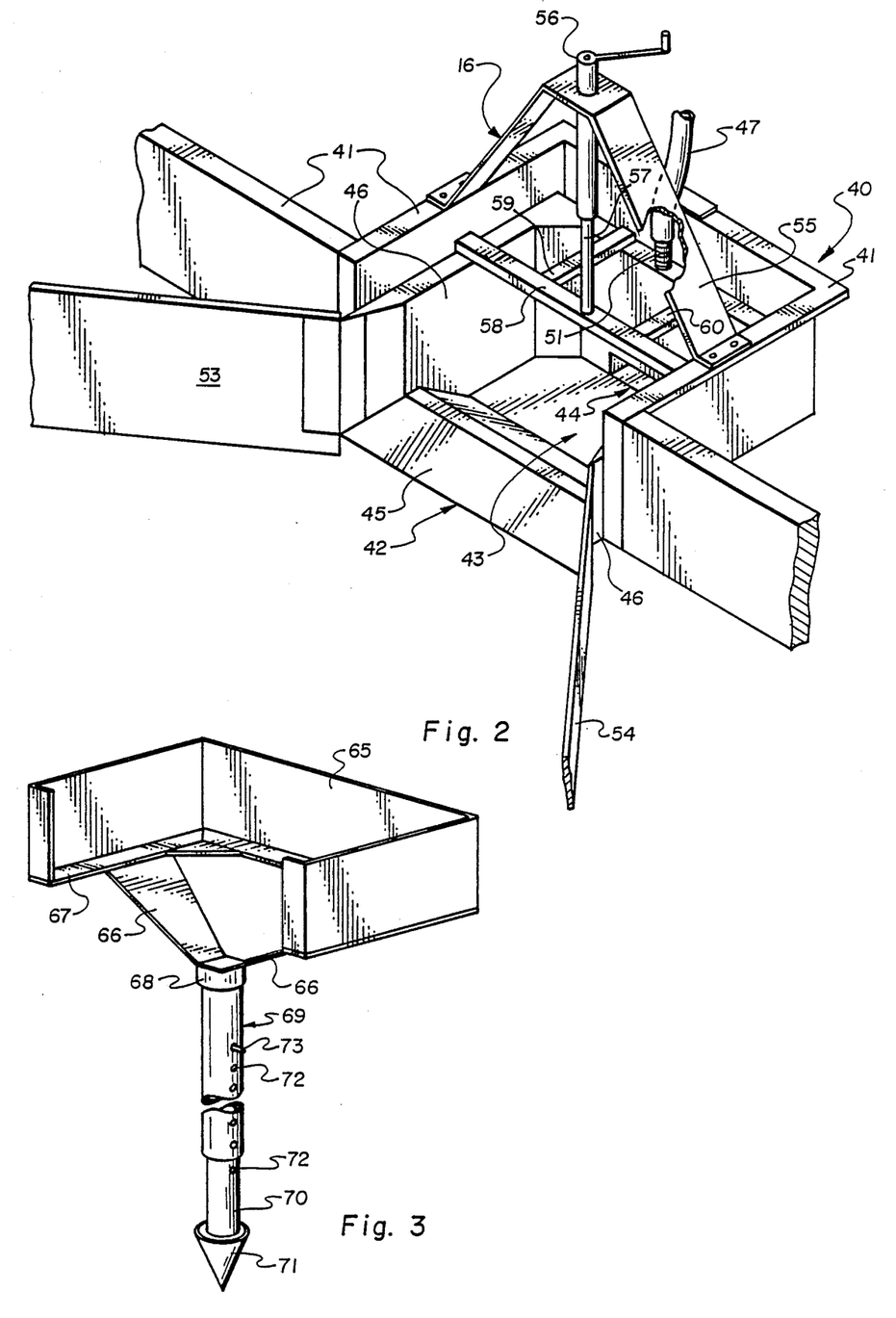
FIG. 2 is a detailed view of a device for concentrating and extracting brine shrimp eggs in accordance with the present invention.
FIG. 3 shows a positioning stand for use with the extracting device separate of a flotation platform.

The primary operating components of the harvesting system are coupled to or near the forward section 11a of the platform A primary feature of this harvesting system is the skimming device 14. This skimming device is shown in great detail in FIG. 3, isolated from the platform. A more detailed discussion of the skimming device is given hereafter.

The wedge-shaped channeling structure 12 operates to g gather and concentrate the floating brine shrimp eggs 15 for extraction by the concentrating device 14. The channeling structure includes a large forward end 20 and a smaller, rearward feeding end 21. The smaller end 21 is retained at the forward section 11a of the platform by brackets 22 and 23. These brackets tie the channel side arms 24 and 25 to the platform structure. In the illustrated vertical orientation, side arms 24 and 25 rest slightly under the water to provide a channeling effect to the surface water and entrained shrimp eggs 15. These side arms or side walls 24 and 25 have a vertical height of approximately 12 inches or 10.48 centimeters and a length of approximately 15 to 20 feet. In the illustrated embodiment, the length of each side arm corresponds to approximately 15 feet, with a separation distance at the larger receiving end 20 of approximately 15 to 20 feet.

The separation distance is variable to enable adjustment of egg concentration by increasing or decreasing the size of the sector enclosed. A larger sector increases egg concentration, whereas a small separation distance results in a decrease.

A cross member 26 spans this opening and maintains the separation distance and relative configuration of the channeling structure. This cross support 26 may be a beam or chain, or any other device for preventing the side arms 24 and 25 from spreading beyond their desired channel configuration. For the flotation embodiment 10, this separation distance will usually always exceed 10 feet or approximately three meters. The separation distance between side arm members at the rearward feeding end 21 will generally be less than six feet or two meters.

The channeling structure 12 is maintained at appropriate water level by the use of height adjustment mechanisms of the side arms 24 and 25. These height adjustment mechanisms are illustrated with respect to side arm 24 and have been deleted from side arm 25 for purposes of simplifying the drawings. It is to be understood that the same structure which is described for the first side arm applies equally to the second side arm structure 25.

These height adjustment devices include a boom support system 13. This boom structure specifically includes a tower member 30 which is anchored at its base to the platform 11 in a sturdy manner. A reel 31 or other length-adjustable device is attached at the top of the tower and is provided with a support line 32 which is extended to a distal end 33 of the side arm 24. A handle 34 is coupled to the reel 31 and enables the selective adjustment of length to the support line 32, thereby raising or lowering the distal end 33 of the support arm 24.

The rearward end of the support arm 24 is adjusted elevationally by use of a worm gear 36 which is journaled in bracket 23 and in support plate 37. Support plate 37 fixes the elevation of the worm gear 36 with respect to the platform 11. Threaded openings within bracket 23 enable the height adjustment of the side arm by rotating the worm gear at handle 36. Accordingly, the proximate end of side arm 24 to the platform is raised and lowered along the axis of the worm gear 36. It will be apparent that other mechanisms can be adapted equally well for adjustment of the forward and rearward ends of the support arms 24 and 25. Accordingly, the present description is not deemed to be limiting with respect to the specific example given.

As the floating harvester 10 moves through the water, the entrained shrimp eggs 15 are gathered and funneled by the wedge-shaped channel structure 12 to direct the eggs toward the rearward feeding end 21. It is here that the concentrating means 14 assumes its critical role in extracting the shrimp eggs 15 from the water body upon which they float.

Referring now to FIG. 2, the concentrating device is identified generally as 40. It includes a skimmer support housing 41 which supports and contains a funnel device 42 which is nested within the housing. A funnel cavity or channel 43 is bounded by a flat, leading edge 45 and side wall structure 46. The channeling structure includes the larger receiving end or opening at the front of the skimmer and a smaller, rearward feeding end 44 at the rear of the skimmer for collecting water and entrained brine shrimp eggs.

The flat receiving edge 45 is attached a the forward receiving end of the funnel and is adapted for positioning and use immediately below the surface of the water and the entrained eggs which are to be withdrawn. Typically, this depth will be no greater than one inch. In this instance, the funnel structure operates similar to the wedge-shaped channel structure identified as item 12 in FIG. 1. The water and entrained eggs are collected at the leading edge 45 and fall into the funnel cavity 43. They are then drawn into the rearward feeding end or suction hole 44 which is coupled to a suction outlet of pump 17. Conduit 47 carries the entrained eggs and water to the pump 17 for delivery through tubing 48 and valving 49 to receptacles 50 which contain the captured eggs.

Pump 17 may be any pump capable of delivering the slurry of eggs and water from the suction hole 44 through a tubular connector 51 to the conduit 47 and thence to the egg distribution network comprising tubing 48, valve 49 and receptacles 50. In the preferred embodiment, the inventors use a self-priming pump which provides automatic operation to the harvester. As is noted from FIG. 2, channel extensions may be added at front ends of the skimming channel structure to extend the channel into a wedge-shaped configuration as illustrated in FIG. 1. These extensions include side arms 53 and 54 as illustrated in FIG. 2.

The funnel 42 also includes means for positioning and maintaining the channel structure just below the surface of the water with the leading edge 45 being selectively positionable at a depth just below the egg layer, usually less than about one inch below the water surface. This function is performed by the support housing 41 as will be evident from its use in connection with the floatable operation of FIG. 1. This support structure 41 operates to generally place the funnel within approximate desired water level position. A more specific height adjustment mechanism 16 is needed to selectively position the funnel 42 and leading edge 45 at the desired depth below the water surface. This position is changing and requires adjustment because of variable depths of floating eggs at the water surface. In typical instances, egg depth may be one eighth to one quarter inch. To skim at a depth of one half inch would result in excessive water being captured within the slurry of egg and water mixture. Under these circumstances, the operation becomes uneconomical and not commercially feasible. It is critical, therefore, that the funnel includes structure which enables its selective adjustment to a variable depth which is determined by an operator or other sensing means. For example, an operator may visually monitor the concentration of eggs being extracted and flowing into the funnel cavity. If excessive water develops, the individual adjusts the penetration depth of the leading edge upward, reducing the amount of water intake.

In the embodiment of FIG. 2, height adjustment is provided by a lift and bracket assembly shown generally as item 16. This assembly includes an upper support brace 55 which bridges opposing sides of the funnel support housing 41. This brace 55 suspends a rotatable crank 56 which is coupled to a telescoping lift member 57. This lift member 57 is coupled at its remote end to a support bar 58 which spans across the channel structure and cavity 43. This support bar is further reinforced by braces 59 and 60 which couple to the rear wall of the funnel.

With this structure, the channel and cavity 43 may be raised or lowered by cranking the lift assembly 56 in an appropriate direction. This funnel structure, supported by the support housing, maintains its adjustment in the vertical direction. Accordingly, this final adjustment mechanism operates with respect to the support housing and enables the operator to adjust the leading edge 45 precisely to the water depth which maximizes the harvest operations.

It will be apparent that other mechanisms may be constructed in accordance with the inventive principles set forth herein. For example, numerous lift assembly configurations may be developed to provide the adjustment required at the leading edge 45. It is intended, therefore, that the example provided herein be viewed as exemplary of the principles of the present invention, and not as restrictive to a particular structure for implementing those principles. These principles include the fact that extraction of brine shrimp eggs must be accomplished at a depth of less than two inches, and preferably at a range of one quarter to one inch in depth. Furthermore, this depth must be adjustable to enable an operator to immediately vary its position as egg layered depth changes across the water surface. The rotational lift assembly illustrated as the preferred embodiment works extremely well to accomplish these principles. Furthermore, such an assembly is available in the form of a commercial jack useful for leveling or raising structures.

In addition to utilization of the channel assembly within a flotation platform, the same structure can be supported by a stand such as is illustrated in FIG. 3. This stand includes a support housing 65 which extends around the back and two lateral sides of an open cavity. The shape of the cavity corresponds to the shape of the funnel support housing 41 and enables the funnel support housing to nest therein and be fully supported laterally and vertically. Sub-support bracing 66 is provided and extends below the base level 67 of the support housing 65. This enables the operation of the height adjustment mechanism, permitting the funnel and leading edge 45 to be lowered below the base housing level 67. Bracing 66 anchors to a cap member 68 which is journaled on top of a vertical support post 69. This support post includes a telescoping member 70 with a pointed end 71, adapting the structure for insertion into the soft sub-sea floor. A general height adjustment mechanism is provided including alignable openings 72 which may be adjusted and fixed in height by an insert pin 73.

In operation, therefore, the support structure of FIG. 3 would be positioned at a water depth proximate to the shore line. The operator would first insert the support post 69 at an appropriate depth, and then seat the housing 65 and cap 68 on top of the support post 69. The operator would then check adjustment of the housing level with respect to water surface level and make any final adjustments by raising or lowering the housing utilizing the openings 72 and pin 73 to be inserted therethrough. With approximate adjustment accomplished, the funnel support housing and contained funnel would then be nested within the support housing 65. Leading edge level would then be adjusted to the appropriate depth at the base of the eggs (one quarter to one inch).

Actual harvesting of the brine shrimp eggs is accomplished by slowly urging the egg layers into the channeling structure and activating a suction pump which withdraws the eggs through a tube which extends to the shore line for appropriate positioning with respect to containers thereat. Accordingly, this second embodiment of the harvester structure for brine shrimp eggs is a fixed position, with the water and entrained eggs being in a movable state. It will be apparent to those skilled in the art that the subject funnel could likewise be hand held by two individuals grasping on each side of the brace 55 and skimmer support housing 41. It is intended, therefore, that the subject invention not be limited to its particular application on a flotation platform or fixed pedestal, but may be equally useful in other environments.

Such use is generally represented by the method steps of (i) identifying a surface layer of floating brine shrimp eggs (ii) positioning a skimming device at the water surface within the brine shrimp egg field, (iii) selectively adjusting a leading lip of the funnel device to a depth of approximately one quarter to one inch and slightly below the layer of brine shrimp eggs, and (iv) moving the entrained eggs into the skimming device for extraction to a separate storage location.

An essential element in the present invention is a porous container for receiving the slurry of salt water and brine shrimp eggs. This container is shown as item 50 in FIG. 1 and item 100 in FIG. 4. This figure illustrates the plumbing system which serves as the delivery means for transporting the slurry of egg and salt water from the feeding end 44 of the channel device to the porous container 100. It includes a delivery line 47 which carries the slurry under power of a self-priming pump 80 into feed lines 81 and 82. Each feed line includes multiple outlets 83 and 84 for delivering the slurry to the ten possible filling locations shown in the figure. Each filling location is valved at its outlet 85 and 86 to provide control for selective discharge of the slurry into a container therebelow. The fifth outlet 83a and 84a along each flow line is shown without the valve 85 and 86, but would include such valves in normal operation. Each valve 85 and 86 includes a valve control lever 88 and 89 for opening and closing the valve as needed.

Figure 4:
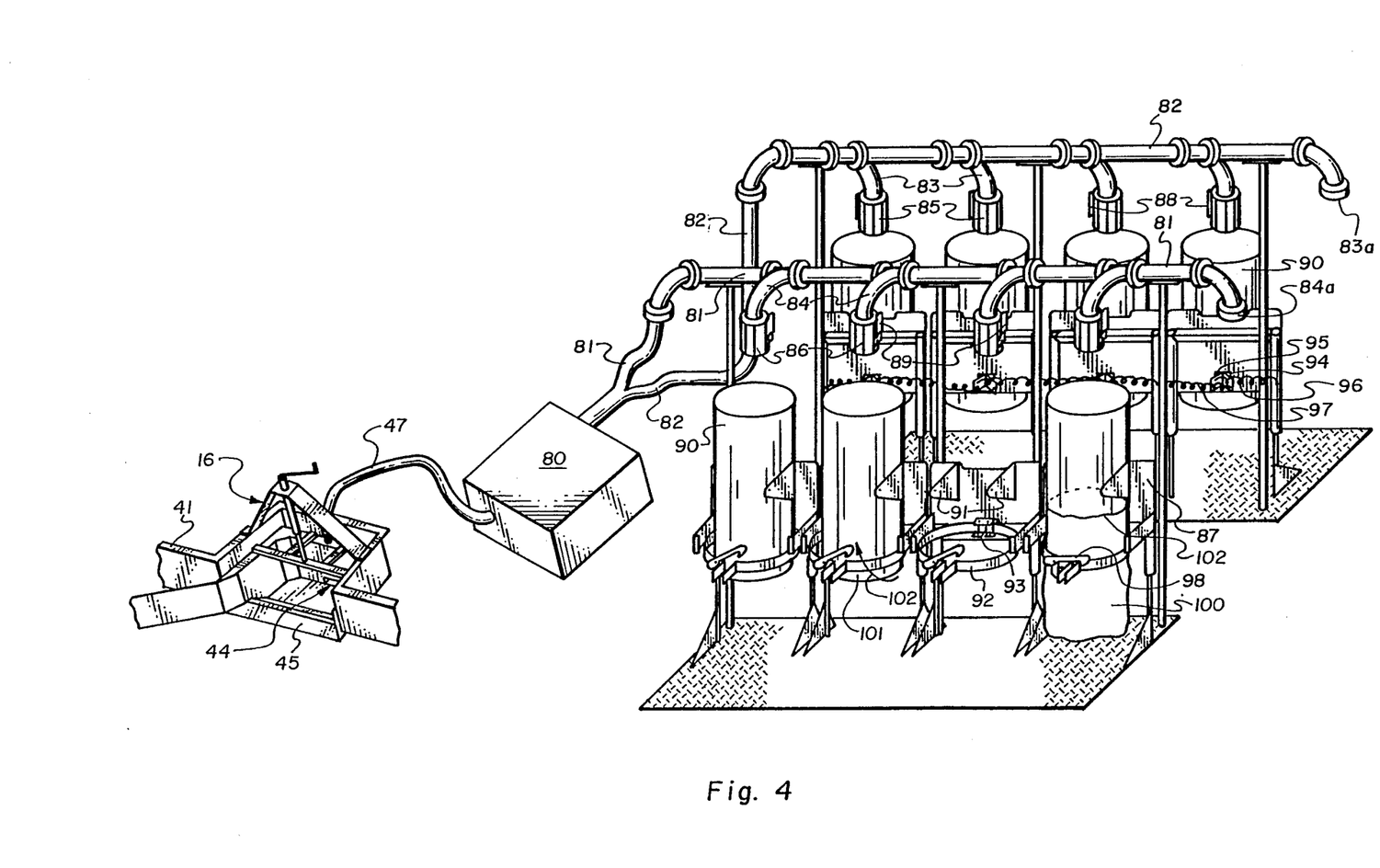
FIG. 4 is a graphic representation of the extraction device coupled to a collection system for bagging the eggs.

These valves are positioned over corresponding support tubes 90 from which the container or bag 100 is suspended. These support tubes comprise an elongate tubular member which is held in an upright orientation above a filling location by means of a shoulder brace 91. A circular clamp 92 is mounted to the support structure 87 which also serves as a mount for the shoulder brace 91. The respective halves of the circular clamp 92 are spring biased to a closed position by attached springs 96 and 97 which are coupled to extending tabs 94 and 95 projecting rearward of a brace attachment 93 to the support plate 87. These springs are attached as shown in FIG. 4 to the brace plate 87 so that tension is applied, pulling the respective tabs 94 and 95 toward a closed position. This force biases the opposing halves of the circular brace 92 in close proximity.

The purpose of this configuration is to enable quick attachment of a porous bag 100 around the base end 101 of the tubular support 90. With the bag attached around the base end 101, the clamp is secured n tightened configuration by a cross clamp 98. This clamp acts to seal the periphery of the junction of bag and tubular member 90 so that no leakage of contained eggs can occur.

In operation, the bag 100 and elongate tubular member 90 which support the bag are filled to level 102, which extends substantially above the top level of the bag 100. As water drains through the porous bag structure, the entrained eggs settle into the bag, leaving it in a substantially full condition. The bag can then be quickly removed, secured at the top and prepared for commercial transport.

As indicated previously, these tubular support members 90 are supported by shoulder braces 91. The preferred attachment of the tubular member 92 shoulder brace includes means for providing a rotational axis so that the lower end of the tubular member 101 can be rotated upward 102 to facilitate attachment of the container or bag 100. By providing an array of support devices capable of positioning the porous container for filling, a continuous operation can be developed.

This operation is represented by the following sequence of steps. The operator grasps the lower end of the support tube 90 and rotates it upward to attach a flexible, porous bag 100. He then rotates the tube back to its upright orientation and clamps 98 the support straps 92 around the top portion of the bag which is mounted on the base or lower end 101 of the support tube 90. This clamp provides a sealed junction which precludes leakage of brine shrimp eggs therethrough. The operator attaches bags at each of the respective ten support tubes 90 and proceeds with a filling operation wherein the gathered brine shrimp eggs in slurry mixture are received at the leading edge 45 and through the feed port 44, being drawn through the feed line 47 into a surge pump 80. The pump advances the slurry mixture into feed lines 81 and 82 for delivery to the respective tube supports 90. The operator successfully opens the valve member 89 and 88 to fill the attached bag and tubular member to a level 102 substantially above the top opening of the bag. As the salt water drains through the porous bag 100, it leaves a full bag of brine shrimp eggs ready for removal. The clamp is released and the top opening of the bag is closed.

The complete system provides an economical and efficient means for harvesting brine shrimp eggs from the surface of a salt water body. The single combination of components enables the gathering, transport and bagging of brine shrimp eggs in a single operation. It represents a substantial improvement over the prior art method of scraping or shoveling dried brine shrimp eggs from the beach or shore area. The development of a method for manipulating brine shrimp eggs in a flowable, slurry state offers many advantages over such prior art techniques.

I claim:

1. A method for harvesting brine shrimp eggs comprising the steps of:
   locating a layer of buoyant brine shrimp eggs on a body of salt water;
   positioning a concentrating funnel having a flat leading edge and a lower trailing inlet port in the salt water with the flat leading edge slightly below the layer of brine shrimp eggs and surface level of the body of water;
   causing relative movement between the leading edge of the concentrating funnel and the eggs to collect a portion of the layer of eggs within the funnel and inlet port as a slurry mixture of salt water and eggs;
   pumping the slurry mixture to at least one porous receiving container which passes the salt water and retains the collected brine shrimp eggs.

2. A method for harvesting brine shrimp eggs an defined in claim 1, wherein the positioning step comprises placing a buoyant platform, having the funnel attached thereto, within the layer of eggs on the water surface and adjusting the attached concentrating funnel and inlet port to the defined position below the water level with .the leading edge of the concentrating funnel in substantial parallel relationship with the surface level of the water.

3. A method for harvesting brine shrimp eggs as defined in claim 2, further comprising the step of pumping the slurry mixture to at least one porous container supported on the buoyant platform, wherein the salt water flows through the container, leaving collected eggs therein.

4. A method for harvesting brine shrimp eggs as defined in claim 2, further comprising the step of extending diverging channeling structure forward of the concentrating funnel and within the layer of eggs to further gather and concentrate egg content within the salt water slurry feeding into the funnel.

5. A method for harvesting brine shrimp eggs as defined in claim 1, wherein the positioning step includes manually supporting the concentrating funnel at the defined position below water level with the leading edge in substantial parallel relationship with water level and moving the funnel through the water to collect a portion of the egg layer.

6. A method for harvesting brine shrimp eggs as defined in claim 1, wherein the positioning step includes (i) supporting the concentrating funnel at the defined position below water level on a fixed support column imbedded in ground below the funnel and (ii) moving the eggs through the water into the fixed funnel to collect a portion of the egg layer.

7. A method for harvesting brine shrimp eggs as defined in claim 1, further comprising the steps of:
   positioning an elongate tube in substantial upright orientation above a filling location for the receiving container;
   attaching a top opening of the container to a base opening of the tube;
   securing the attachment of the container and tube such that substantial leakage is precluded therethrough; and
   filling the container and tube with the slurry mixture to a level above the base opening such that the water gradually passes through the porous container, allowing the eggs to settle into and substantially fill the container.

8. A device for gathering brine shrimp eggs from the surface of a body of water, comprising:
channeling structure having a forward section, a support surface, lateral edges and a rearward section;
flotation means coupled to the platform for maintaining sufficient buoyancy to keep the platform floating at the surface of the water;
channeling structure having a forward receiving end and rearward feeding end, said forward end including a base plate with a flat, leading edge adapted for positioning immediately below the shrimp eggs at the water surface, said channeling structure being coupled to the forward section of the platform and being adapted to receive water and entrained shrimp eggs at the channel receiving end and to channel the entrained eggs toward the feeding end;
height adjustment means coupled to the channel structure for providing adjustment of the height of the leading edge to a depth slightly below the surface of the water and entrained eggs to thereby collect the entrained eggs within the channel structure;
extraction means positioned at the feeding end and having an intake opening adapted to receive the entrained eggs and transport them to a storage location;
at least one porous container capable of separating brine shrimp eggs from a slurry of eggs and salt water;
means for delivering the slurry received at the extraction means to the porous container.

9. A device as defined in claim 8, further comprising a container support device including:
an elongate tubular member and means for supporting the tubular member in upright orientation above a filling location;
means for attaching a top opening of the porous container to a bottom opening of the tubular member; and
means for retaining the container in the attached position while the slurry mixture is filled within the container.

10. A device as defined in claim 9, wherein the means for attaching the porous container comprises a strap suspended in circumscribing manner above the bottom opening and around the tube such that a top portion of the container can be captured between the strap and exterior face of the tubular member when the strap is adjusted to a tightened configuration.

11. A device as defined in claim 9, wherein the attachment means for attaching the container to the tubular member includes means for sealing the junction of container to tubular member such that the combined container and tubular member may be filled above the top opening of the container and into the tubular member without substantial leakage of slurry.

12. A device as defined in claim 9, wherein the means for supporting tubular member further comprises a rotational support mount which enables the bottom opening of the tubular member to rotate to a forward and raised position to facilitate attachment and removal of the container thereto.

13. A device as defined in claim 9, wherein the container comprises a flexible sack having porous openings which permit passage of the salt water but retain the brine shrimp eggs therein.

14. A device as defined in claim 9, further comprising an array of container support devices in fixed positions and a system of fixed distributor plumbing having valved openings over each container support device to enable selective delivery of slurry to any container attached thereto and wherein the delivery means includes plumbing attached between the extraction means and the system of distributor plumbing.

15. A device as defined in claim 8, wherein the height adjustment means provides selective leveling adjustment to position the flat leading edge to a depth of less than two inches below surface water, thereby minimizing the amount of water extracted with the shrimp eggs.

16. A device as defined in claim 8, wherein the height adjustment means provides selective leveling adjustment to position the flat leading edge to a depth of less than one half inch below surface water, thereby minimizing the amount of water extracted with the shrimp eggs.

17. A device as defined in claim 8, wherein the height adjustment means comprises a jack having a height adjustable element, means for coupling the element to the leading edge, and a jack handle for selecting the desired height for the adjustable element.

18. A device as defined in claim 8, wherein the extraction means comprises a pumping system having an intake end and output end, said intake end being coupled to the feeding end to receive the salt water and entrained eggs, the output end being positioned at the container for discharging the eggs therein.

19. A device as defined in claim 8, wherein the channeling structure includes a boom-support system including diverging, wedge-oriented channel members, said boom system being comprised of a tower support anchored to the platform and a support line extending from a top portion of the tower to a distal end of a supported sidewall.

20. A device for gathering brine shrimp eggs from the surface of a body of water, comprising:
channeling structure having a large, open, forward receiving end and a smaller rearward feeding end for collecting water and entrained brine shrimp eggs, said channeling structure being adapted to receive water and entrained shrimp eggs at the channel receiving end and to channel the entrained eggs toward the feeding end;
a flat leading edge attached at the forward receiving end and being adapted for use immediately below the surface of the water at a depth no greater than one inch to divide off suspended brine shrimp eggs at the surface of the water for delivery into the channeling structure;
means for positioning and maintaining the channeling structure approximately at the surface of the water, said leading edge being selectively positionable at a depth of less than one inch below the water surface;
extraction means coupled to the feeding end of the channeling structure for receiving the entrained eggs for transport to a storage location; and
at least one porous container capable of separating brine shrimp eggs from a slurry of eggs and salt water;
means for delivering the slurry received at the extraction means to the porous container.

21. A device as defined in claim 20, wherein the means for positioning and maintaining the structure at the surface of the water comprises at least one support post adapted with means on one end for submersing in soft ground at a position below the water surface, said post including means on the other end for height adjustable attachment to the channeling structure.

* * * * *

UNITED STATES PATENT AND TRADEMARK OFFICE
CERTIFICATE OF CORRECTION

PATENT NO. : 4,839,062

DATED : June 13, 1989

INVENTOR(S) : Bruce C. Sanders

It is certified that error appears in the above-identified patent and that said Letters Patent is hereby corrected as shown below:

Column 2, line 39 following "then" delete --.--.

Column 5, line 12 following "to" delete --g--.

Column 6, line 28 following "attached" replace "a" with --at--.

Column 9, line 18 following "secured" replace "n" with --in--.

Column 11, line 6 delete "channeling structure" and replace therefore --a platform--.

Signed and Sealed this

Fourth Day of December, 1990

Attest:

HARRY F. MANBECK, JR.

*Attesting Officer*     *Commissioner of Patents and Trademarks*